United States Patent

Shimizu

[11] Patent Number: 5,966,250
[45] Date of Patent: *Oct. 12, 1999

[54] METHOD AND LIGHT COLLECTION SYSTEM FOR PRODUCING UNIFORM ARC IMAGE SIZE

[75] Inventor: Jeffrey A. Shimizu, Westchester County, N.Y.

[73] Assignee: Philips Electronics North America Corp., New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/565,699

[22] Filed: Nov. 30, 1995

[51] Int. Cl.[6] .................. G02B 17/00; G02B 13/00; F21V 29/00
[52] U.S. Cl. ............... 359/727; 359/728; 359/649; 359/724; 362/268
[58] Field of Search ................. 359/364, 649, 359/651, 724, 727, 728; 362/268

[56] References Cited

U.S. PATENT DOCUMENTS

| | | | |
|---|---|---|---|
| 1,740,609 | 12/1929 | Lebby | 359/727 |
| 2,013,845 | 9/1935 | Wolfe | 359/727 |
| 2,170,979 | 8/1939 | Straubel | 359/727 |
| 2,273,801 | 2/1942 | Landis | 359/724 |
| 2,510,521 | 6/1950 | Rinia | 359/724 |
| 2,574,031 | 11/1951 | Gretener | 359/727 |
| 2,589,883 | 3/1952 | Soller et al. | 359/727 |
| 2,593,724 | 4/1952 | Bouwers | 359/727 |
| 2,664,027 | 12/1953 | Raitiere | 359/728 |
| 2,669,709 | 2/1954 | Glancy et al. | 359/727 |
| 4,637,691 | 1/1987 | Uehara et al. | 359/727 |
| 4,642,740 | 2/1987 | True | 362/268 |

FOREIGN PATENT DOCUMENTS

| | | | |
|---|---|---|---|
| 0455735 | 4/1949 | Canada | 359/651 |
| 0077725 | 3/1990 | Japan | 359/727 |
| 0613608 | 12/1948 | United Kingdom | 359/651 |

OTHER PUBLICATIONS

Epstein, et al, "Projection Television," Journal of The Society of Motion Picture Engineers, vol. 44, No. 6, (Jun. 1945), pp. 443–455.

Primary Examiner—Georgia Epps
Assistant Examiner—Evelyn A. Lester
Attorney, Agent, or Firm—F. Brice Faller

[57] ABSTRACT

A structure and method for a collection system for a projector includes a collector for reflecting light and a correcting mechanism for receiving the reflected light. The collector and the correcting mechanism, in combination, correct the light and output a light beam having a uniform image size.

13 Claims, 4 Drawing Sheets

METHOD AND LIGHT COLLECTION SYSTEM FOR PRODUCING UNIFORM ARC IMAGE SIZE

BACKGROUND OF THE INVENTION

The present invention generally relates to projection systems and more specifically to a light collection system for a projection system, and more particularly to a light collection system in which a projected light beam has a uniform arc image size throughout the width of the light beam.

DESCRIPTION OF THE RELATED ART

Projection systems generally include a light source that is projected through a semi-transparent medium such as theatrical film or a light valve (i.e., a liquid crystal display (LCD)). Then, the light beam is focused with a lens and displayed on a screen. Conventional light sources generally include incandescent filament bulbs, high intensity discharge lamps or arc light bulbs using compressed noble gasses, such as compressed xenon or the like.

To increase the efficiency of a projector system, a collector is used to reflect the light from the light source. The collector has a curved or conical shape to direct the light from the light source toward the semi-transparent medium. A lens or a plurality of lenses are commonly used to further increase the collection of the light which radiates from the collector. Lenses also may focus the light from the semi-transparent medium onto a viewing screen.

An exemplary conventional system is shown in FIG. 1, in which a light source 10 emits light beams 15. The light beams 15 are reflected by a collector 11 to the semi-transparent medium 12. In general, usable light beams are first reflected by the collector 11. The light beams traveling directly from light source 10 to the semi-transparent medium 12 are normally not usable.

The light beams 15 pass through the semi-transparent medium 12 to illuminate an image. Then, the light beams 15 are focused with focusing lens 13 and the image from the semi-transparent medium 12 is displayed on the screen 14.

Typically, there may be additional beam shaping or imaging optics, color filters and the like both between the collector 11 and the semi-transparent medium 12 and between the semi-transparent medium 12 and the focusing lens 13.

Arc lamps that are typically used in projection systems emit light over a very broad angular range (nearly a full sphere). In order to capture a high percentage of the light, the lamp is placed in a deep collector having a parabolic or elliptical shape. Parabolic or elliptical collectors typically exhibit large aberrations which increase the "extent" of the light beam.

"Extent" is a term which describes the size of the beam or the size of the corresponding optical system. The maximum usable extent of a projection system is typically limited by the size of the light valve (LCD) and the aperture of the projection lens.

If the extent of the illumination beam is greater than the extent of the projection system, some of the light will be lost. Therefore, it is advantageous for a collection system to produce a light beam with as small an extent as possible to reduce power consumption and/or reduce manufacturing costs associated with projection systems of smaller size and/or aperture.

The main aberration of an elliptical or a parabolic collector is "coma". Coma is an unnatural distortion of the image of the light source. Coma occurs because the light image size changes as the image of the light source is reflected from different radial positions on the collector.

To illustrate this type of distortion, the collector is divided into zones. In the case of the parabolic collector, magnification in the center zone (i.e., on axis of the collector) is the greatest and magnification decreases towards a full zone (i.e., the outer edges of the collector).

Because of coma, if the point on the axis just fills the pupil of the projection lens, then zones off the center zone will dramatically underfill the pupil. Thus, the projection lens must have a relatively large aperture (e.g., a small F No.) to capture the full illumination beam. However, the requirement of a large aperture is undesirable. Therefore, it is advantageous to minimize or eliminate coma within a projection system in another manner.

FIG. 2 shows the effect of coma, and illustrates a parabolic collector 20 which reflects beams from a light source. Coma causes light rays which are emitted at equal angular spacing to be reflected at unequal spacing in the collimated beam. A first group of beams 22 and 24 have a higher light intensity than a second group of beams 21 and 25. Specifically, the first group of beams have beams more closely spaced than those of the second group.

A collection system can be designed to eliminate the coma present in a parabolic collector. Such a constant magnification system performs well only if the arc is spherical. However, many arc lamps have light emitting areas which are elongated (i.e., non-spherical arc light source). When the light source is non-spherical, the size of the arc light source image (i.e., arc image) changes with collection angle. Therefore, even with a constant magnification system, when a non-spherical light source is utilized, the size of a non-spherical arc image (as viewed from the semi-transparent medium 12 in FIG. 1) would be different at different zones.

Thus, beyond having different illumination intensities, the first and second group of beams produce different-size images of the non-spherical light source. Sometimes, the object of a collection system is to produce a uniform illumination intensity. However, attaining this object does not necessarily ensure that the arc image, as a function of the collection angle, will have a uniform size. Thus, the light beam will have a greater extent than when the arc image size is kept constant as a function of collection angle.

FIG. 2 also illustrates a collimated output in which all output beams are parallel. Some collection systems produce a collimated output while others create a focused, finite image. Such a finite image exists only at a certain point (i.e., the focal point normally selected to be at the semi-transparent medium). A collimated system is more flexible because the image size and position can be determined with a lens independent of the collection system.

Yet another problem is "center obscuration" or "under filling", also shown in FIG. 2. Center obscuration relates to a dark spot or "hole" projected from the axis of the collection system. Arc lamps are usually mounted with the bulb axis along the axis of the collection system. The light distribution of such lamps are such that little light energy is emitted along the lamp axis, as shown by the shaded area 23 in FIG. 2. This is a problem because it leads to a dark spot in the distribution and/or inefficient use of the projection lens aperture.

SUMMARY OF THE INVENTION

In view of the foregoing problems of the conventional systems, it is an object of the present invention to provide an improved collection system which creates an arc image which is independent of the collection angle and which has an improved collection efficiency over the conventional arrangement.

Another object is to provide a collection system in which a smaller system aperture may be used than with the known projector systems.

A farther object of the present invention is to provide an improved collection system that produces a uniform arc image size in all zones for a collimated beam or a non-collimated beam.

Another object is to provide a uniform arc image size from either a spherical or a non-spherical light source.

An additional object is to reduce center obscuration.

In a first aspect according to the present invention, a collection system, provided for a projector, includes a light source, a collector, adjacent the light source, for reflecting light from the light source, and a correcting mechanism, typically adjacent the collector and the light source, for correcting the light and for outputting a light beam having a uniform image size.

With the inventive system, a collimated output beam is produced that prevents coma and spherical aberration.

With a second collection system according to the present invention, the system has a controlled amount of coma which compensates for the apparent change in arc size with collection angle. This optimizes the collection system for an arc which is not spherical.

Finally, a third system is provided according to the present invention which at least partially corrects center obscuration, as compared to the conventional systems.

BRIEF DESCRIPTION OF THE DRAWINGS

The foregoing and other objects, aspects and advantages will be better understood from the following detailed description of preferred embodiments of the invention with reference to the drawings, in which.

DETAILED DESCRIPTION OF PREFERRED EMBODIMENTS OF THE INVENTION

Figure 3:
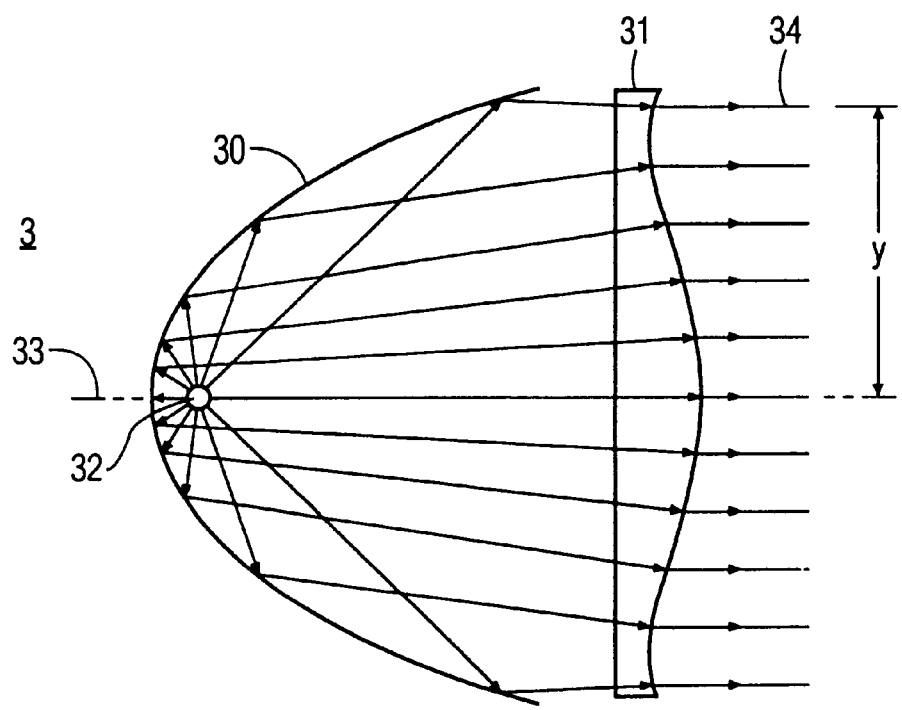
FIG. 3 illustrates a collection system according to the present invention including a light source, a collector and a correcting mechanism.

Referring now to the drawings, and more particularly to FIG. 3, there is shown a collection system 3 according to the present invention.

In FIG. 3, a light source 32 is mounted in a collector 30 and emits light rays. The light source 32 is mounted in the collector 30 such that the light rays are reflected by a collector 30 at a collection angle $\Theta$ (e.g., shown in greater detail in FIG. 4) to an optical axis 33. The light source is placed at the focal point of the collector. The collector is shaped so as to distribute the light in a manner consistent with the desired magnification.

The light rays are transmitted to a corrective lens 31, which preferably is a transmissive lens element made of glass. In a preferred embodiment, the first surface is planar and the second surface is convex adjacent the axis and changes to concave toward the edge of the lens. The function of the lens is to provide collimation of the light beam.

The light rays are corrected by the corrective lens 12 and are transmitted therefrom as a collimated output beam. With the inventive configuration, the output beam is free of coma, as discussed in further detail below. Further and more generally, the output beam has a uniform arc image size.

The collector 30 (reflector) and the corrective lens 31 (refractor) are formed and shaped as described in detail below, to produce these and other unexpected advantages of the invention.

Specifically, as discussed above, a collimated output beam contains light rays each of which are parallel to one another. The collimated output beam in FIG. 3 produces a uniformly sized arc image in all zones.

Figure 1:
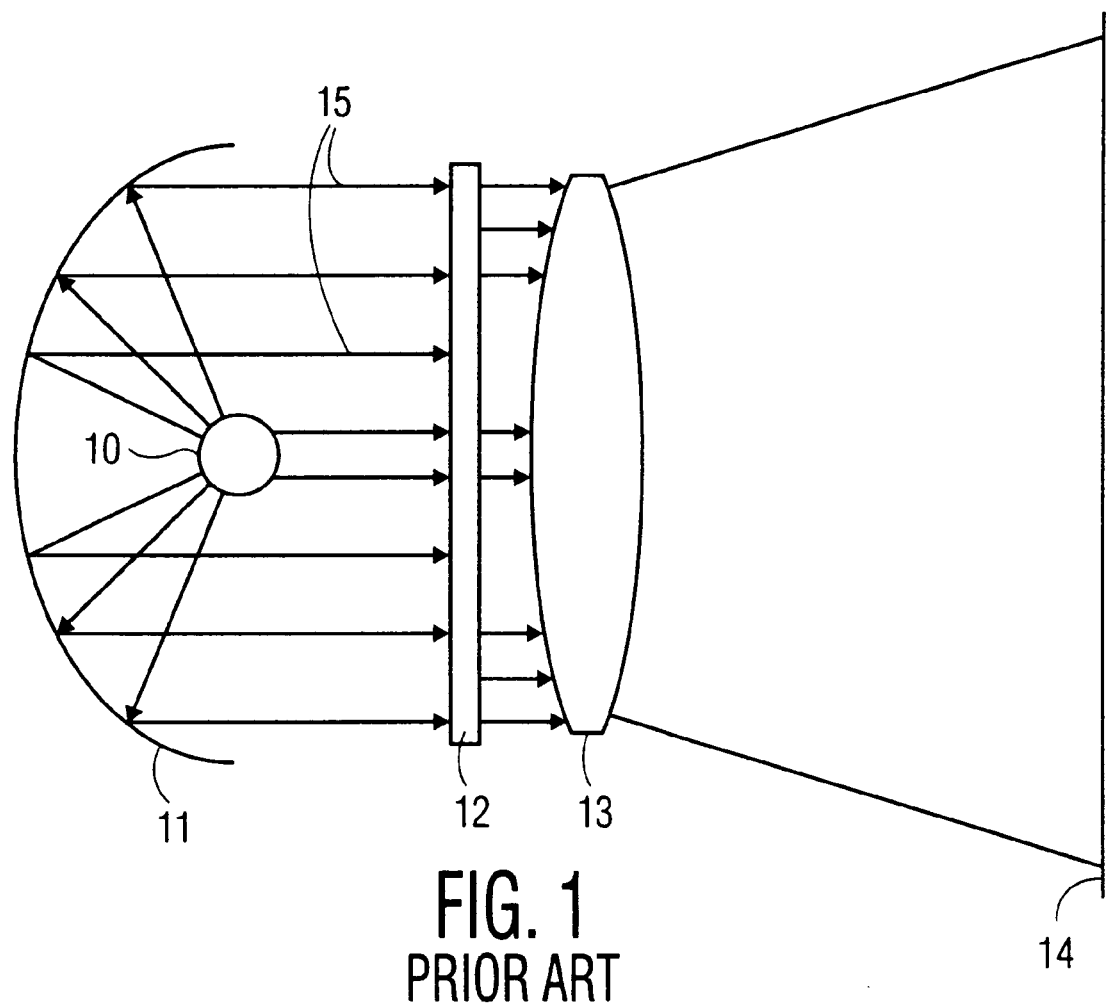
FIG. 1 illustrates a conventional projection system.
Figure 2:
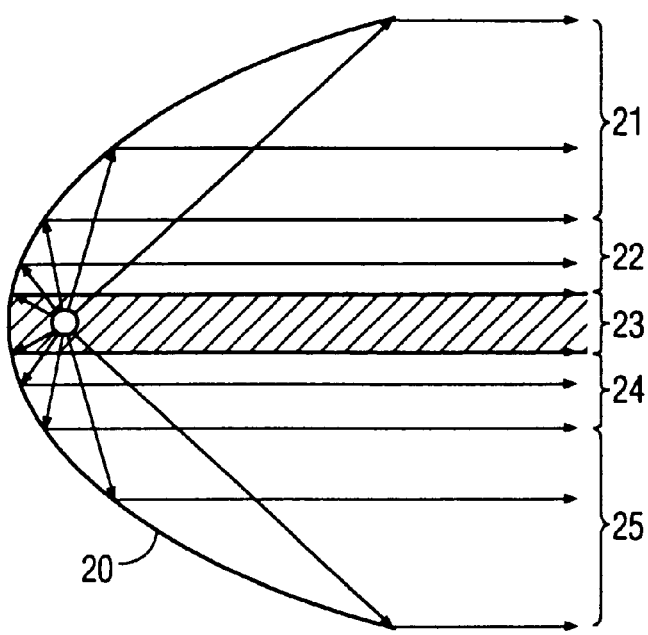
FIG. 2 is a schematic diagram of a conventional collector and a light source for the projection system of FIG. 1.

Therefore, all points on the object (here the light source) make full (and optimum) use of the projection lens aperture and, thus, the inventive system is more efficient than a system which does not utilize the full aperture. This allows for a smaller system aperture which allows less costly components to be used. This structure and capability are fundamentally different from the system shown in FIG. 2, in which the first group of beams 22 and 24 have a different light intensity and a different-size image than the second group of light beams 21 and 25, as discussed above.

Figure 5:
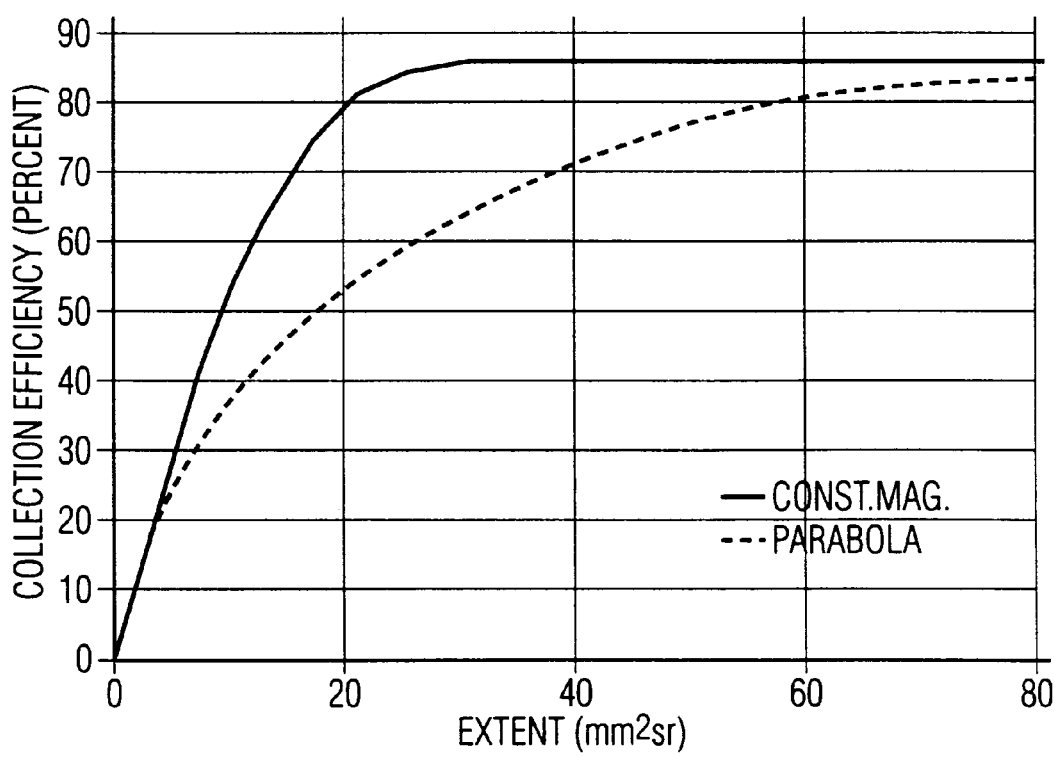
FIG. 5 is a graph illustrating the relationship of collection efficiency and extent according to the collection system of the present invention.

The advantage of the constant magnification system of the invention as shown in FIG. 3, is seen quantitatively by examining the collection efficiency versus optical extent. Extent, as described above, is the size of the beam or size of the optical system. FIG. 5 illustrates the collection curves for a parabolic collector and the constant magnification system of FIG. 3. In FIG. 5, it is assumed that the arc is spherical and lambertian.

For any given extent, the collection efficiency from the constant magnification system is equal to or greater than that of a parabolic collector. Conversely, the constant magnification collector reaches a given collection value at a smaller extent than a parabolic collector. A smaller extent results in reduced cost of the components external to the collection system.

Another novel aspect of the invention is the production of a uniform size of arc image, as discussed below. As mentioned, when the light source is spherical and correcting the illumination intensity across multiple zones will also produce a uniform arc image across the zones. However, when using a non-spherical light source, simply correcting the illumination intensity will not produce a uniform size of arc image.

To produce a uniform arc image for a spherical arc, the tangential magnification should be kept constant as the ray height and collection angle change. A variable "y" is defined as the "exiting ray height" (or distance) as measured from the optical axis. For example, the exiting ray height of ray 34 is the distance "y" from the optical axis 33 to the edge of the ray. The exiting ray height depends on the positioning of the light source and the shape and structure of the collector.

Figure 4:
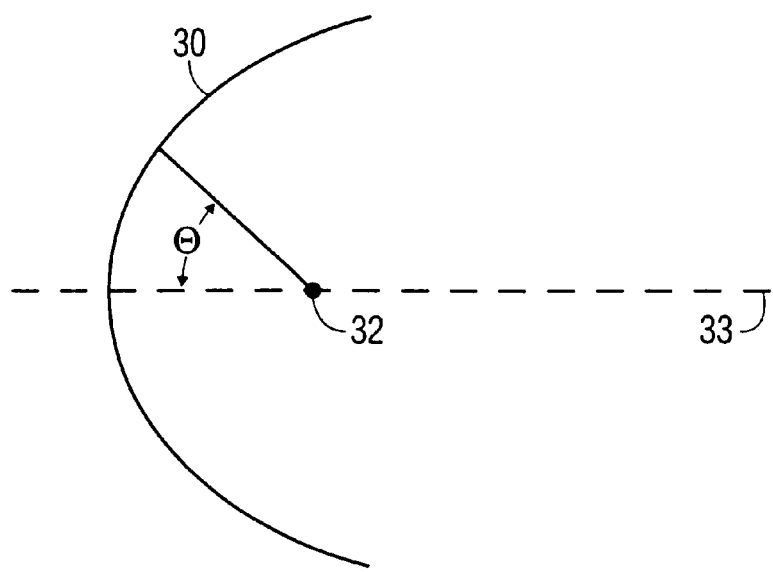
FIG. 4 illustrates a collection angle formed by the collector and the light source of the collection system of the present invention shown in FIG. 3.

Also, a variable $\Theta$ zone corresponding to is defined as the angle of the ray emitted by the light source to the axis 33, as illustrated in FIG. 4. Therefore, the collimated system in FIG. 3 has a magnification m, which, as a function of collection angle $\Theta$, is represented below as:

$$m(\Theta) = d\Theta/dy \qquad (1)$$

Thus, for a spherical arc, the magnification $m(\Theta)$ is constant as the collection angle $\Theta$ and ray height y changes.

Additionally, for a non-spherical arc, magnification $m(\Theta)$ should be kept inversely proportional to the apparent arc size $s(\Theta)$. This inverse relationship is represented below as:

$$m(\Theta) = c/s(\Theta) \qquad (2)$$

In the above equation, c is a constant of proportionality related to absolute arc size so that $y(\Theta_{max}) = y_{max}$ and $s(\Theta)$ is the apparent size of the arc as viewed from the angle ($\Theta$). The variable $\Theta_{max}$ is the maximum angle that will allow a light beam to contact the collector. $y_{max}$ represents the light ray farthest from the axis and thus the radius of the output beam. In FIG. 3, light ray 34 is emitted at $\Theta_{max}$ and produces a beam at $y(\Theta_{max})$ that is equal to $y_{max}$. By substitution and integration, the following equation is established:

$$y(\Theta) = c \int_0^\Theta s(\Theta) d\Theta + y(0) \qquad (3)$$

In the above equation $\Theta=0$ corresponds to a light ray that travels in the direction of the vertex of the collector (i.e., along the axis 33 in FIG. 3) and $y(0)$ would also be zero in that the ray would not have a height above the axis 33. Here too c is a constant of proportionality.

Equation 3 is used to form the collector 30. A corrective lens 31 is then shaped to produce a collimated light beam which also satisfies equation (3). As a pair, the collector 30 and corrective lens 31 produce a uniform size of arc image in all zones, wherein each zone correspond to a single collection angle.

As a practical matter, it is unusual for a light source to emit light along the vertex of the collector. Instead, there is usually a center obscuration as shown in the shaded area 23 of FIG. 2. As discussed above, this is caused by the design of the light source.

Further, there is generally an opening at the deepest part of the collector to allow the light source to be inserted into the collector. Therefore, there is a minimum angle where light can strike the collector which is referred to as $\Theta_{min}$. The corresponding minimum ray height is referred to as $y(\Theta_{min})$. Substituting these variables in equation 3 results in the following:

$$y(\Theta) = c \int_{\Theta_{min}}^\Theta s(\Theta) d\Theta + y(\Theta_{min}) \qquad (4)$$

Equation (3) is a special case of equation (4) where $\Theta_{min}=0$.

Figure 6:
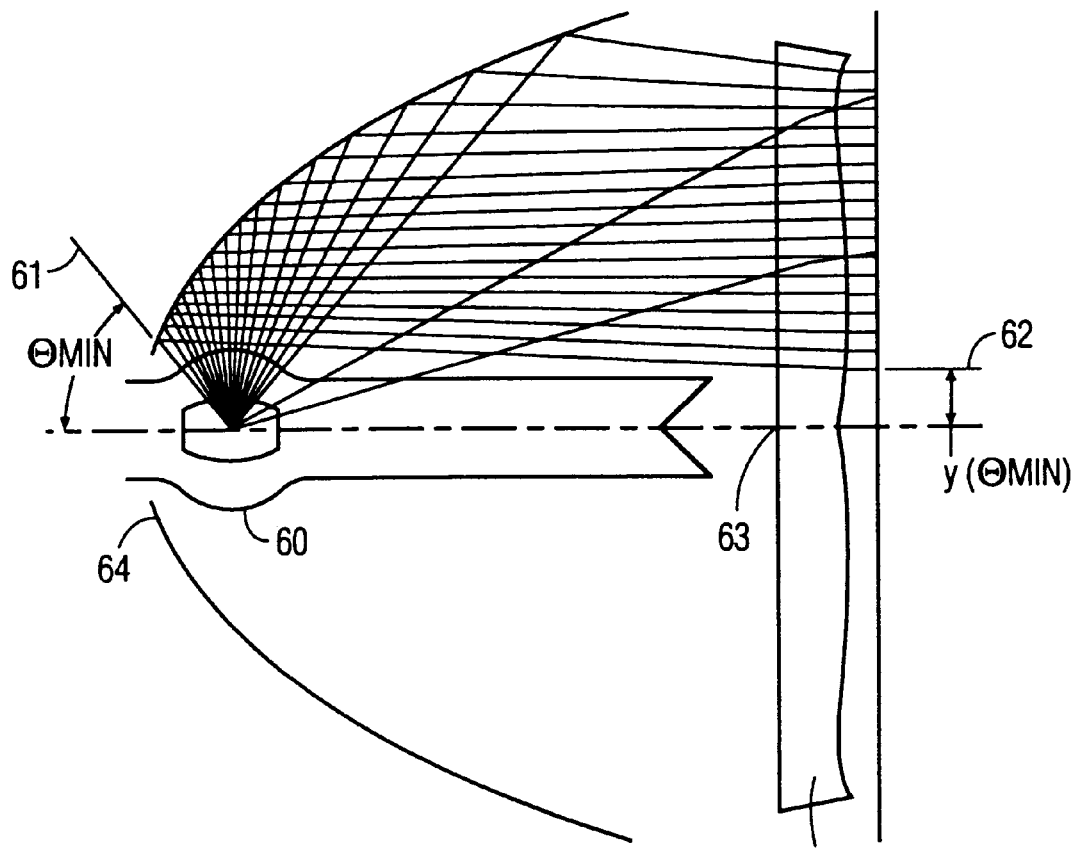
FIG. 6 illustrates a collection system according to the present invention which provides a reduction of center obscuration, as compared to the conventional systems.

To minimize the center obscuration, a collector 64 according to the present invention is preferably shaped to direct light toward the vertex of a corrective lens 65, as shown in FIG. 6.

In FIG. 6, a light source 60 protrudes through an opening in the collector 64. For clarity and ease of understanding, only the light rays on the upper half of the light source are illustrated in FIG. 6.

The angle $\Theta_{min}$ is associated with light beam 61 and is the minimum angle at which light will be reflected from the collector 64. The collector 64 is shaped to reflect light beam 61 toward the vertex 63 of the corrective lens 65 so that beam 61 exits corrective lens 65 at a height $y(\Theta_{min})$ 62.

Therefore, by shaping the collector 64 to reflect light to the center and shaping the corrective lens 65 according to equation (4), the center obscuration can be minimized while still producing a collimated light beam that produces a uniform arc image size and which is substantially coma-free.

The above discussion has been directed to a collimated light beam. For a system which forms an image of the arc at a finite distance, the magnification is established according to the following:

$$m(\Theta) = d\Theta/d(\sin \Phi) \qquad (5)$$

The angle $\Phi$ is the angle which the light beam forms with the arc image plane. As illustrated in the exemplary system of FIG. 7, the light source 70 is reflected by the collector 71 to the corrective lens 72 which forms a focussed image of the arc light at a finite distance (e.g., focal point 73) away from the corrective lens 72 along axis 74. The angle $\Phi$ is formed by light beam 75 with the axis 74.

Substituting equation (5) into equation (3) produces the following:

$$\sin\Phi = c \int_{\Theta_{min}}^\Theta s(\Theta) d\Theta + \sin\Phi(\Theta_{min}) \qquad (6)$$

Therefore, a collection system which satisfies equation (6) is advantageously used when a non-collimated beam is desired so that an image of the arc light can be produced at a finite distance. The non-collimated beam will have a uniform arc image size.

To form the inventive collection system, a commercially available light source with appropriate illumination characteristics, voltage requirements and heat dissipation is preferably selected. Such light sources are commonly available from many vendors. For example, a preferred light source is a short arc, metal halide lamp.

Figure 7:
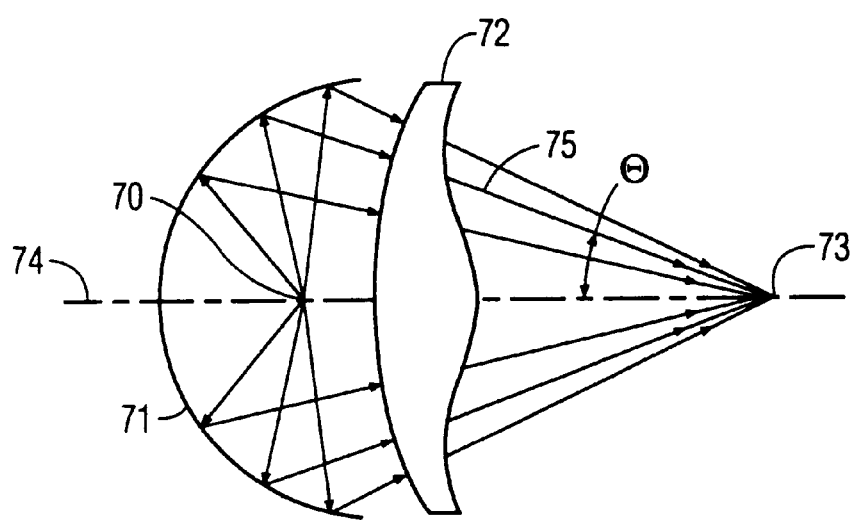
FIG. 7 illustrates a non-collimated output of the collection system according to the present invention.

The collector is formed with an inner reflective surface and sufficient structure to support the light source. The collector is preferably formed of molded glass elements. The shape of the collector is determined such that, in combination with the corrector lens, the collection system satisfies the desired magnification relationship to produce a uniform arc image size. If it is necessary to remove a portion of the collector to support the light source, the collector is shaped to direct light into toward the vertex of the corrective lens, as shown in FIG. 7.

The corrective lens shape is determined such that the rays are directed to either a finite location or at infinity (for a collimated beam). The corrective lens, in combination with the collector, satisfies equations above.

The resulting collection system will produce a beam which is free of distortion and which has a uniform arc image size as designed for a spherical or non-spherical light source.

A unique and unobvious advantage of the present invention is that collection efficiency is significantly improved as compared with beam extent. This leads to systems having increased brightness and illumination and/or less expensive components in the optical system. For example, in a Liquid Crystal Display (LCD) projection system, the size of the LCD can be reduced which strongly affects the overall system cost.

Additionally, a projection lens with a smaller aperture and/or smaller field of view can be used, which decreases system cost. Further, in devices where system extent is limited, such as with the Digital Micro-mirror Device (DMD), system light efficiency can be significantly improved.

While the invention has been described in terms of several preferred embodiments, those skilled in the art will recognize that the invention can be practiced with modification within the spirit and scope of the appended claims.

For example, while the systems shown in FIGS. 3, 6 and 7, illustrate a single reflector and single refractive correction element, a plurality of reflective and refractive elements can be provided so long as the elements in combination satisfy the above relationships set forth in the equations.

Further, while an arc lamp has been discussed above, any light source can be used such as a filament source or the like.

Having thus described my invention, what I claim as new and desire to secure by Letters Patent is as follows:

1. A light projection system comprising
a source of arc light,
a reflector having an optical axis with a focal point on which said source is located, said reflector receiving light from said source at a collection angle relative to said optical axis and reflecting light from zones which are determined by said collection angle, and
a correcting refractor positioned on said axis to directly receive light reflected from said zones,
wherein said reflector and said correcting refractor are designed so that said correcting refractor directly outputs collimated light having a uniform size of arc image over all zones of said reflector.

2. A light projection system as in claim 1 wherein said reflector in combination with said correcting refractor satisfies $$y(\Theta) = c \int_{\Theta_{min}}^{\Theta} s(\Theta) d\Theta + y(\Theta_{min});$$

wherein $\Theta$ is said collection angle, $y(\Theta)$ is the distance from said optical axis of a light ray outputted from said refractor, $s(\Theta)$ is the size of the arc image seen from the zone corresponding to angle $\Theta$, $\Theta_{min}$ is the minimum collection angle where light can strike the reflector, and c is a proportionality constant.

3. A light projection system as in claim 2 wherein the light reflected from the reflector at $\Theta_{min}$, is reflected toward the optical axis so that $y(\Theta_{min})$ is minimized, whereby center obscuration caused by the light source is minimized.

4. A light projection system as in claim 1 wherein said source is a non-spherical source.

5. A light projection system as in claim 1 wherein said correcting refractor consists of a single lens element.

6. A light projection system as in claim 1 wherein said reflector is aspheric.

7. A light projection system comprising
a non-spherical source of arc light,
a reflector having an optical axis with a focal point on which said source is located, said reflector receiving light from said source at a collection angle relative to said optical axis and reflecting light from zones which are determined by said collection angle, and
a correcting refractor positioned on said optical axis to directly receive light reflected from said zones,
wherein said reflector and said correcting refractor are designed so that said correcting refractor directly outputs a uniform size of arc image over all zones of said reflector.

8. A light projection system as in claim 7 wherein said reflector and said correcting refractor are designed so that said correcting refractor outputs collimated light.

9. A light projection system as in claim 7 wherein said system forms an image of the source at a finite distance from said correcting refractor.

10. A light projection system as in claim 9 wherein the arc image is magnified according to $m(\Theta) = d\Theta/d(\sin \Phi)$, wherein $\Theta$ is the collection angle, m is the magnification, and $\Phi$ is the angle which a light beam from the refractor makes with the optical axis.

11. A light projection system as in claim 10 wherein $$\sin\Phi = c \int_{\Theta_{min}}^{\Theta} s(\Theta) d\Theta + \sin\Phi(\Theta_{min})$$

where $\Theta_{min}$ is a minimum collection angle at which light will be reflected from the reflector,
$\Phi$ is an angle between the light from the lens element and the optical axis, and $\Phi(\Theta_{min})$ is the angle $\Phi$ of light from the reflector at $\Theta_{min}$, and
$s(\Theta)$ is an apparent arc size as viewed from the zone corresponding to collection angle $\Theta$.

12. A light projection system as in claim 7 wherein said correcting refractor consists of a single lens element.

13. A light projection system as in claim 7 wherein said reflector is aspheric.

* * * * *